United States Patent
Burbaum et al.

(10) Patent No.: US 11,504,774 B2
(45) Date of Patent: Nov. 22, 2022

(54) MANUFACTURING METHOD FOR HARD-TO-WELD MATERIALS

(71) Applicant: Siemens Energy Global GmbH & Co. KG, Munich (DE)

(72) Inventors: Bernd Burbaum, Falkensee (DE); Henning Hanebuth, Pliening OT Gelting (DE); Ahmed Kamel, Orlando, FL (US); Thomas Lorenz, Erlangen (DE); Kazim Ozbaysal, Charlotte, NC (US); Ingo Reinkensmeier, Fröndenberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/761,877

(22) PCT Filed: Nov. 13, 2017

(86) PCT No.: PCT/US2017/061251
§ 371 (c)(1),
(2) Date: May 6, 2020

(87) PCT Pub. No.: WO2019/094036
PCT Pub. Date: May 16, 2019

(65) Prior Publication Data
US 2020/0376554 A1    Dec. 3, 2020

(51) Int. Cl.
*B22F 3/10*   (2006.01)
*B23K 35/30*  (2006.01)
(Continued)

(52) U.S. Cl.
CPC ............ *B22F 12/00* (2021.01); *B22F 3/1017* (2013.01); *B22F 5/04* (2013.01); *B23K 1/0056* (2013.01);
(Continued)

(58) Field of Classification Search
CPC ...... B22F 3/1055; B22F 10/10; B23K 1/0056; B23K 35/3033; B33Y 10/00
See application file for complete search history.

(56) References Cited

U.S. PATENT DOCUMENTS 6,195,864 B1   3/2001   Chesnes
8,640,942 B1   2/2014   Ozbaysal et al.
(Continued)

FOREIGN PATENT DOCUMENTS

CN   101508070 A   8/2009
CN   106563929 A   4/2017
(Continued)

OTHER PUBLICATIONS

Oerlikon Metco, Material Product Data Sheet Amdry BRB Diffusion Braze Alloys, 2014 (Year: 2014).*
(Continued)

*Primary Examiner* — Anthony J Zimmer
*Assistant Examiner* — Sean P. O'Keefe

(57) ABSTRACT

A method of manufacturing a hard-to-weld material by a beam-assisted additive manufacturing process is presented. The method includes depositing a first layer for the material onto the substrate, the first layer including a major fraction of a base material for the component and a minor fraction of a solder, depositing a second layer of the base material for the component and a thermal treatment of the layer arrangement. The thermal treatment includes a first thermal cycle at a first temperature above 1200° C. for a duration of more than 3 hours, a subsequent second thermal cycle at a second temperature above 1000° C. for more than 2 hours, and a subsequent third thermal cycle and a third temperature above 700° C. for more than 12 hours. A manufactured component is also presented.

11 Claims, 2 Drawing Sheets

(51) Int. Cl.
  *B33Y 10/00* (2015.01)
  *B22F 12/00* (2021.01)
  *B22F 5/04* (2006.01)
  *B23K 1/005* (2006.01)
  *B33Y 70/00* (2020.01)
  *B33Y 80/00* (2015.01)
  *B22F 10/10* (2021.01)

(52) U.S. Cl.
  CPC .......... *B23K 35/3033* (2013.01); *B22F 10/10* (2021.01); *B22F 2202/11* (2013.01); *B22F 2301/155* (2013.01); *B22F 2998/10* (2013.01); *B33Y 10/00* (2014.12); *B33Y 70/00* (2014.12); *B33Y 80/00* (2014.12)

(56) References Cited

U.S. PATENT DOCUMENTS

| | | | |
|---|---|---|---|
| 2009/0188590 A1 | | 7/2009 | Hu et al. |
| 2013/0232749 A1 | | 9/2013 | Bruck et al. |
| 2013/0302647 A1 | | 11/2013 | Ozbaysal et al. |
| 2014/0017415 A1 | * | 1/2014 | Lin .................. B23P 6/045 427/580 |
| 2015/0290747 A1 | * | 10/2015 | Ozbaysal ............ C22C 19/007 420/451 |
| 2016/0167172 A1 | | 6/2016 | Goncharov et al. |
| 2016/0175934 A1 | | 6/2016 | Lacy et al. |
| 2016/0354842 A1 | * | 12/2016 | Schick ............... B23K 35/0238 |
| 2017/0100804 A1 | | 4/2017 | Goncharov |
| 2017/0314114 A1 | | 11/2017 | Ozbaysal et al. |
| 2018/0065324 A1 | * | 3/2018 | Isobe .................... B22F 1/00 |

FOREIGN PATENT DOCUMENTS

| | | | | |
|---|---|---|---|---|
| DE | 102015219345 A1 | 4/2017 | | |
| EP | 1258545 A1 | 11/2002 | | |
| EP | 1867423 A1 | 12/2007 | | |
| EP | 2790858 A1 | 10/2014 | | |
| EP | 3103570 A1 | 12/2016 | | |
| EP | 3112055 A1 | 1/2017 | | |
| EP | 2822726 B1 | * 5/2019 | .......... | B23K 1/0018 |
| JP | 2003206748 A | 7/2003 | | |
| JP | 2008128147 A | 6/2008 | | |
| JP | 2015522420 A | 8/2015 | | |
| JP | 2016508070 A | 3/2016 | | |
| JP | 2016117276 A | 6/2016 | | |
| KR | 20150088181 A | 7/2015 | | |
| KR | 20150126055 A | 11/2015 | | |
| KR | 20160133573 A | 11/2016 | | |
| WO | 2013087515 A1 | 6/2013 | | |
| WO | 2014085892 A1 | 6/2014 | | |
| WO | 2014120913 A2 | 8/2014 | | |
| WO | 2016075423 A1 | 5/2016 | | |

OTHER PUBLICATIONS

Dinkel, M. K., et al. "New boron and silicon free single crystal-diffusion brazing alloys." Proceedings of the international symposium on superalloys. 2008 (Year: 2008).*

PCT International Search Report and Written Opinion of International Searching Authority dated Jul. 3, 2018 corresponding to PCT International Application No. PCT/US2017/061251 filed Nov. 13, 2017.

* cited by examiner

MANUFACTURING METHOD FOR HARD-TO-WELD MATERIALS

BACKGROUND

1. Field

The present application relates generally to manufacturing or a deposition method for hard-to-weld materials, such as a metallic alloy, and more particularly to a method of manufacturing a hard-to-weld material for a component by a beam-assisted additive manufacturing process.

2. Description of the Related Art

In an embodiment, the material is applied to a component used in a turbo machine, e.g. in the flow path of a gas turbine. The component may be a blade or vane. The component may thus comprise a superalloy or nickel-based material.

Additive manufacturing techniques may comprise powder bed methods such as selective laser melting (SLM), selective laser sintering (SLS), or electron beam melting (EBM). Laser Metal Deposition (LMD) and laser cladding methods can also be performed as additive manufacturing methods.

A method of laser welding is described in WO 2015/150019, for example.

Blades of gas turbines are usually exposed to high thermal loads during their intended operation. Thus, the thermally highly resistive superalloys, usually based on nickel, are required for these components. Despite a precipitation, age or dispersion hardening having been applied to the base material for these components, said materials are prone to develop cracks during the cladding or deposition process and/or subsequent heat treatments.

The mentioned cracks usually occur at the liquid-solid interface in the melt pool of the respective manufacturing or repair method. Said cracks can—due to the high mechanical loads during the operation of the component—lead to severe damage to the component as well as to the whole turbo machine.

As the manufacture of turbine blades and comparable components from the given superalloys is complicated and costly, there is a demand to further optimize or improve manufacturing of the mentioned components and extend the life-cycle thereof. This may be achieved by novel improved manufacturing methods, such as the mentioned additive processes.

Turbine blades operating in gas turbines constitute spare parts which have to be maintained and refurbished regularly. For the refurbishment, mainly the tips of the blades are usually machined back and later coated by laser welding or laser cladding methods to re-establish the worn tip material during refurbishment.

A major and known drawback for the manufacture or refurbishment of turbine components is the complexity to manufacture thermally highly resistive superalloys by conventional welding methods. Even though the material deposition by welding is possible, the provided material often lacks the required structural material properties, e.g. in terms of mechanical (high temperature) strength, resistance to cracks, rupture, oxidation, corrosion or corresponding fatigue. In turn, it may be possible to provide materials with particularly good high temperature strength and possibly even oxidation resistance simultaneously. Then, however, this material can no longer be processed by welding techniques.

A particularly high fraction of intermetallic gamma ($\gamma$), gamma prime ($\gamma'$) phases have shown to be advantageous to give the mentioned materials good mechanical strength.

The manufacturing method as described herein may relate to bottom-up manufacturing or to a deposition e.g. on top of the pre-manufactured substrate or blade root by a beam-assisted additive manufacturing method, such as LMD, wherein a continuous laser beam may be used for remelting a base material. Said base material may be provided by a corresponding powder beam feeding.

An objective of the present disclosure is to additively provide a superalloy material with a particularly low density of crack centers or tendency to show cracks or rupture, thus to give said material an improved structural quality and at the same time allow for improved weldability.

As a consequence, the turbo machine or the gas turbine components installed in such a turbo machine can work more efficiently and possibly with less maintenance or service efforts.

SUMMARY

Briefly described, aspects of the present disclosure relate to a method of manufacturing a hard-to-weld material for a component by a beam-assisted additive manufacturing process, a component manufactured according to the method, and an apparatus for manufacturing a structure of a component by laser metal deposition.

A first aspect provides a method of manufacturing including depositing or building up a hard-to-weld material for a component by a beam-assisted additive manufacturing process. The method comprises depositing a first layer for the material onto the substrate, the first layer comprising a major or predominant fraction of the base material for the component and a minor fraction of the solder. The method further comprising depositing a second layer of the base material for the component. The method further comprises a thermal treatment of the layer arrangement, comprising the first and the second layer. The thermal treatment comprising a first thermal heating cycle at the first temperature above 1200° C. for a duration of more than 2 hours. The first temperature may be a brazing or soldering temperature. The thermal treatment further comprises a subsequent second thermal cycle at a second, temperature above 1000° C. for a duration of at least 2 hours. The second temperature may be a diffusion temperature. The thermal treatment further comprises a subsequent third thermal cycle at a third, temperature above 700° C. for a duration of more than 12 hours. The third temperature may be a post-diffusion or stress-relaxation temperature.

A second aspect provides a provides a component wherein the component is manufactured or manufacturable according to the described method. The component may be a component applied in a hot gas path of a gas turbine such as a blade or vane. The component may be further composed of or comprises a plurality of stacked or consecutively deposited layers, as described. Accordingly, the layers may be identified, e.g., in a cross section, by means of the respective welding beads of each of the deposited layers or sublayers.

A third aspect provides an apparatus for manufacturing a structure of the component, such as turbine blade or vane by laser metal deposition, the apparatus being configured to selectively provide for a plurality of different powdery substances, e.g. via a switch in the powder feeding, and the substances e.g. comprising a nickel-based superalloy and similar solder materials as described above.

BRIEF DESCRIPTION OF THE DRAWINGS

Like elements, elements of the same kind and identically acting elements may be provided with the same reference numerals in the Figures.

DETAILED DESCRIPTION

Figure 1:
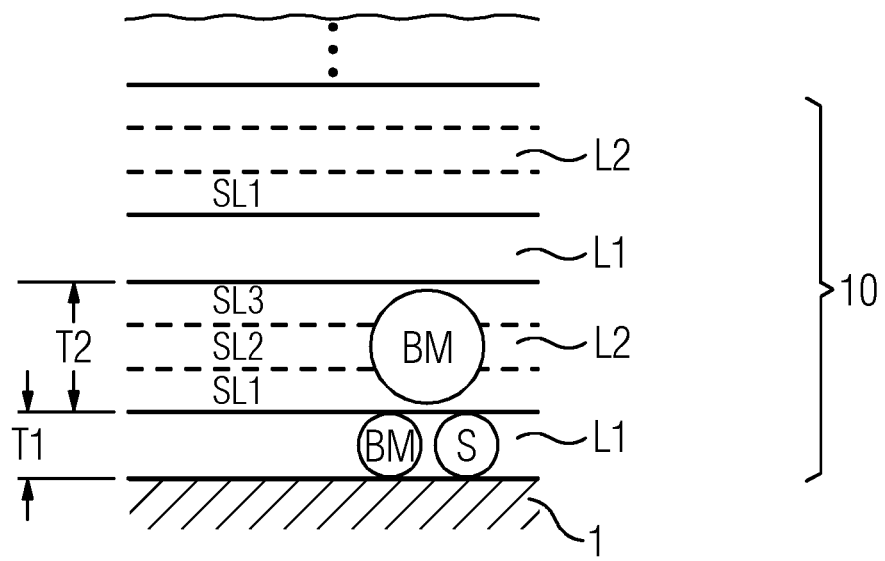
FIG. 1 shows a schematic sectional indication of a layered structure, indicating method steps according to an embodiment.

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

The presented thermal heat treatment cycle(s) may be adjusted to show the best structural results for a plurality of superalloys in terms of crack or rupture tendency or porosity.

The term 'hard-to-weld material' as used herein may include the mentioned base material as well as the mentioned solder or a remainder of the solder.

In an embodiment, the thermal treatment describes a brazing or soldering treatment. The thermal treatment may be a hard soldering and/or a high-temperature soldering.

By the given measures, the additive deposition of the given materials have a particularly low tendency to show cracks, either as a full generative manufacture or for repair or refurbishment applications, can be facilitated. Further, weldability of the given alloys can be proven along with a favorable structural quality.

In an embodiment, the base material is similar to the solder material. In other words, the solder material may comprise a constituent or major ingredient which is equal to the base material.

In an embodiment, the base material comprises a significant fraction of intermetallic phase. The base material may comprise a $\Upsilon$ or $\Upsilon$'-phase.

In an embodiment, the first layer and/or the second layer are deposited via laser metal deposition. In another embodiment, the first layer and/or the second layer are deposited via laser metal powder deposition. According to these embodiments, deposition is performed at room temperature and can be performed at rates which are not feasible with powder bed based processes, such a SLM.

In an embodiment, the base material is a powder from a nickel-based superalloy, such as 'Inconel738', 'Rene80', or 'Alloy247'.

In an embodiment, the base material is precipitation or dispersion hardened, or accordingly hardenable.

In an embodiment, the solder comprises at least one of the materials: "AmdryBRB", "Amdry DF-4B" and "Ni1248".

In an embodiment, the solder or soldering process is free of a melting point depressive agent, such as boron or silicon. This provides the advantage, that the similarity of the material composition of the base material and the solder can be maintained so the process includes optimal or expediently low tendency to show cracks or ruptures during the manufacture or any post-manufacture heat treatment.

In an embodiment, a layer thickness of the first layer is chosen between 200 and 400 μm. In another embodiment, the layer thickness is chosen to be 300 μm±20 μm.

In an embodiment, the second layer (layers stack) is composed of and/or deposited via three sublayers of the base material, each of which includes a layer thickness between 200 and 400 μm. In another embodiment, the second layer (layers stack) is composed of and/or deposited via three sublayers of the base material, each of which includes a layer thickness of 300±20 μm.

In an embodiment, a layer thickness of a sublayer of the second layer is chosen between 200 and 400 μm. In another embodiment, a layer thickness of a sublayer of the second layer is chosen to be 300 μm±20 μm.

In order to reach the full height of the structure to be deposited for the component to be manufactured, a plurality of first and second layers may be deposited and stacked alternately.

In an embodiment, the first layer is deposited at a rate between 2 and 10 cm$^3$/h. In another embodiment, the first layer is deposited at a rate above 6 cm$^3$/h.

In an embodiment, the second layer is deposited at a rate between 2 and 10 cm$^3$/h. In another embodiment, the second layer is deposited at a rate above 6 cm$^3$/h.

In an embodiment, the first layer is deposited directly onto the substrate in order to prevent cracking, such as hot cracking or rupture in the base material during the manufacture or during the thermal treatment.

In an embodiment, the method is a hybrid manufacturing, repair or refurbishment process.

In an embodiment, the method is a generative, bottom-up and/or ab-initio manufacturing process.

In an embodiment, the component comprises a microstructure without or free of cracking centers with a particularly low tendency to show cracks or pores.

In an embodiment, the component comprises a (residual) porosity or pore diameter of less than 300 μm. Said pore diameter may denote a maximum pore diameter and/or an average pore diameter of the according porosity.

FIG. 1 shows a schematic section view of a layer stack for a component 10, e.g. during its additive manufacture. Said manufacture may be performed by a beam-assisted additive manufacturing process, such as laser metal deposition on a substrate 1. In an embodiment, the laser metal deposition may be a laser powder metal deposition on a substrate 1.

By means of FIG. 1, at least parts of the presented method are illustrated.

Figure 2:
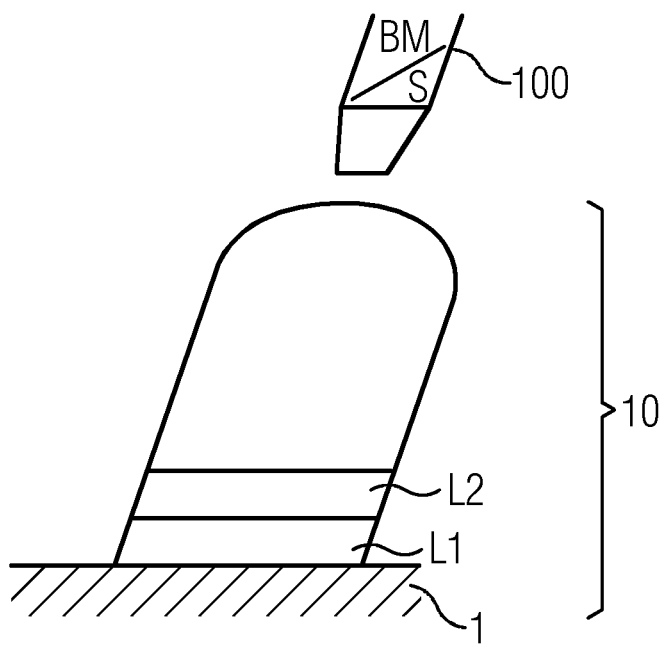
FIG. 2 shows a schematic indication of a turbine blade or vane during its bottom-up manufacture.

The term 'substrate' as used herein may relate to a base plate which only serves for supporting the structure of the component to be manufactured. FIG. 2 shows an example of a substrate 1 used for supporting a structure of a component 10 to be manufactured. Accordingly, the presented method may relate to a generative, bottom-up and/or ab initio manufacturing process.

Figure 3:
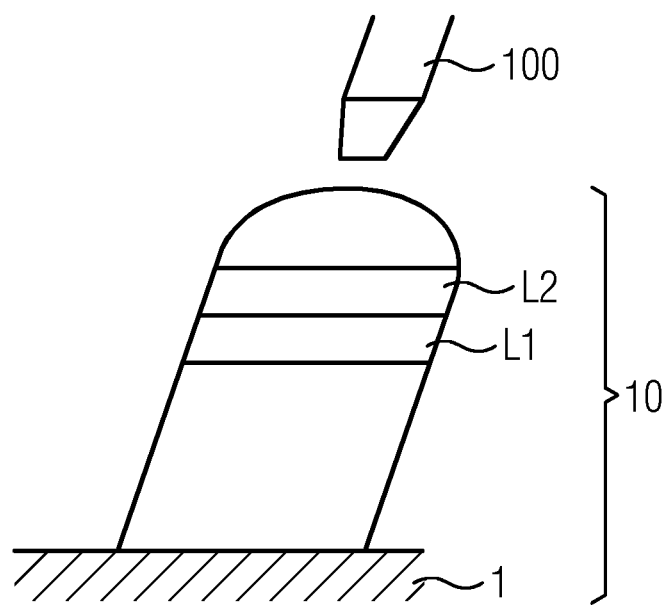
FIG. 3 shows a schematic indication of an additive repair or refurbishment process of a turbine blade or vane, and FIG. 4 indicates method steps according to the manufacturing method according to an embodiment.

Alternatively, the substrate may relate to a pre-existing or pre-manufactured component. In an embodiment, as shown in FIG. 3, the substrate 1 may be an already machined section of an airfoil of a blade or vane for a gas turbine.

Accordingly, the presented method may relate to a hybrid manufacturing, repair or refurbishment process.

Directly on top of said substrate 1, as shown in the embodiments of FIGS. 1 and 2, a layer L1 is deposited or manufactured by the given means. Thereby, layer L1 may be adhesively or metallurgically connected to the substrate 1.

The first layer L1 for the material of the component comprises a major fraction of the base material BM for the component 10 and a minor fraction of the solder S or braze material. The solder is intended to form an adhesive or metallurgic connection of the layer stack as shown in FIG. 1.

The term 'major fraction' may relate to a fraction of e.g. 60% of the overall material of the first layer L1. The term 'minor fraction' may relate accordingly to a fraction of the e.g. 40% of the overall material of the first layer L1. Apart from these percentages, the material of the first layer L1 may be composed of any other relationship of base material BM and solder S, respectively.

The direct deposition of the layer L1 on the substrate 1, advantageously allows to prevent cracking or cracking tendency in the base material BM during the buildup and any subsequent thermal treatment, for example.

In an embodiment, the base material BM may comprise a powder from a metal, such as a nickel-based superalloy. These powders may include Inconel738, Rene80 or Alloy247.

In an embodiment, the solder may comprise at least one of the substances, 'AmdryBRB', 'Amdry DF-4B', and 'Ni1248'.

In an embodiment, the solder S is further free of or lacks a melting point depressive agent, such as boron. As well, in an embodiment, the soldering process does not make use of any melting point depressive agent.

The base material BM may comprise a significant fraction of intermetallic phase, such as the $\Upsilon$ or $\Upsilon'$-phase.

A layer thickness of the first layer L1 may be chosen between 200 and 400 μm. In an embodiment, the layer thickness of the first layer L1 is 300 μm with an accuracy or variation of ±50. In another embodiment, the layer thickness of the first layer L1 is 300 μm with an accuracy or variation of ±20.

On top of the first layer 1, a second layer L2 of the base material BM is deposited according to the presented method.

In an embodiment, the second layer L2 is deposited by the same means as layer L1. The second layer L2 may further comprise a material with an at least partly different material composition as compared to the material of the layer 1.

In an embodiment, the layer L2 further constitutes or comprises a sub-stack of sequence of sublayers SL1, SL2, and SL3. The sublayers are consecutively deposited as single layers and may be deposited by laser welding or laser cladding techniques. Each sublayer may be deposited or provided with a layer thickness between 200 and 400 μm. In an embodiment, the layer thickness of the first layer L1 is 300 μm with an accuracy or variation of ±50. In another embodiment, the layer thickness of the first layer L1 is 300 μm with an accuracy or variation of ±20. Thus, the overall layer L2 may comprise a layer thickness of around 900 μm.

The first L1 and/or the second layer L2 may be deposited at a rate of above 6 cm$^3$/h.

The component 10 or deposit may be composed of alternatingly arranged first and second layers L2, L2, as shown in FIG. 1. According to the presented method, the layers may then be alternatingly deposited until a final height or design of the component 10 is reached.

FIG. 2 indicates the component 10 during its bottom-up manufacture by an apparatus 100. The apparatus 100 may be suitable for depositing a structure for the component, in the present case a turbine blade or airfoil thereof.

The apparatus 100 may be further configured to selectively provide for a plurality of different powdery substances, e.g. via a switch in the powder feeding. Said substances e.g. comprise the listed materials for the base material BM and the solder S.

When fully assembled, built up or manufactured, the component 10 may comprise superior material and/or surface properties and an improved microstructure. In an embodiment, the structure of the component 10 is—by its manufacturing process—inherently awarded with a low or no tendency to show rupture or cracks. This allows in turn to apply the deposited material or component in a harsher environment, i.e., at higher operating or gas temperatures as in the case of conventional materials or manufactured methods.

The as-manufactured component 10 may comprise a residual porosity or pore diameter of less than 300 μm, less than 200 μm, or less than 150 μm.

As compared to FIG. 2, FIG. 3 shows an analogous situation, wherein the component 10 is only repaired or refurbished by the presented method rather than being fully additively manufactured. Accordingly, the component may comprise a pre-existing "substrate" 1 and further layers L1 and L2 are manufactured on top of the pre-existing part or root.

Figure 4:
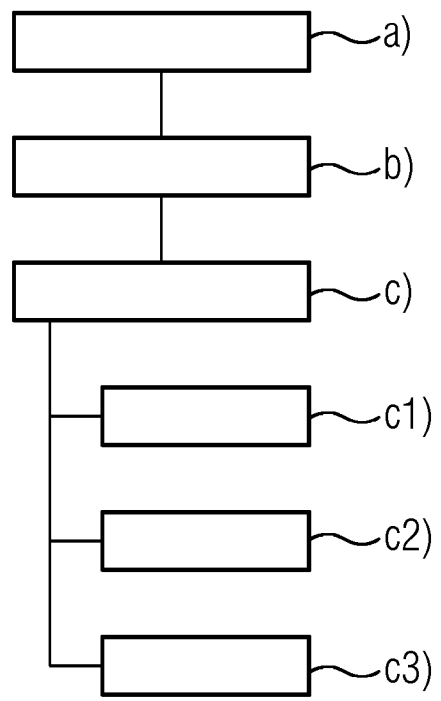

FIG. 4 indicates by means of a schematic flow chart, method steps of the presented method.

As mentioned above, the method comprises, a), depositing a first layer L1 for the material onto the substrate 1, the first layer 1 comprising a major fraction of the base material BM for the component 10 and a minor fraction of the solder S.

The method further comprises b) depositing a second layer L2 of the base material BM for the component 10 and, c), thermal treatment of the layer arrangement.

In an embodiment said thermal treatment comprises, c1), a first thermal cycle at a first temperature above 1000° C. In another embodiment, the thermal treatment comprises the first thermal cycle at a first temperature above 1100° C. In a further embodiment, the thermal treatment comprises the first thermal cycle at a first temperature above 1200° C. For example, the first temperature may be 1248° C.±15° C. for a duration of more than 1½ hours. In another example, the duration may be 2-4 hours.

The first thermal cycle as described may be a brazing or soldering cycle.

In an embodiment, said thermal treatment further comprises, c2), a (subsequent) second thermal cycle at a second temperature above 800° C. In another embodiment said thermal treatment is at a second temperature above 900° C. In a further embodiment said thermal treatment is at a second temperature above 1000° C. For example, the thermal treatment may be at 1160° C. for more than 1-2 hours. In an embodiment, the thermal treatment lasts for more than 3 hours.

The second thermal cycle as described may be a diffusion cycle.

The thermal treatment further may comprise, c3), a subsequent third thermal cycle and a third temperature above 700° C. In another embodiment, the third thermal cycle is performed above 800° C. For example, the heat treatment may be performed at 870° C. for more than 8 hours. In a further embodiment, the heat treatment may be performed for more than 10 hours, such as 12 hours or more.

In an embodiment, a third cycle may be a two-step or binary thermal cycle with a first heating or annealing or sub-cycle of the component 10 at a temperature of above 900° C. For example, the temperature may be above 1000° C. such as 1080° C. for a duration of more than 1½ hours. In an embodiment, the third cycle may be performed for 2 hours.

The second heating, annealing or sub-cycle may comprise heating the component at a temperature of above 600° C. In an embodiment, the second heating may comprise heating the component at a temperature above 700° C. For example, the second heating may comprise heating the component at a temperature such as 870° C. for a duration of more than 10 hours such as above 12 hours. In a further embodiment the duration of the second heating may be 20 hours.

The third thermal cycle as described may be post-diffusion or relaxation cycle.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method of manufacturing a material for a component (10) by a beam-assisted additive manufacturing process comprising:
    depositing a first layer (L1) for the material onto a substrate (1), the first layer comprising a major fraction of a base material (BM) for the component (10) and a minor fraction of a nickel-based solder (S);
    depositing a second layer (L2) of the base material (BM) for the component (10) on top of the first layer; and
    thermal treating the first layer and the second layer (L1, L2) comprising,
        a first thermal cycle at a first temperature above 1200° C. for a duration of more than 2 hours,
        a second thermal cycle at a second temperature above 1000° C. for more than 2 hours,
    a third thermal cycle at a third temperature above 700° C. for more than 12 hours, and wherein a layer thickness of the first layer (L1) is chosen between 200 and 400 µm.

2. The method according to claim 1, wherein the first (L1) and/or the second layer (L2) are deposited via laser metal deposition.

3. The method according to claim 2, wherein the first (L1) and/or the second layer (L2) are deposited via laser powder metal deposition.

4. The method according to claim 1, wherein the base material (BM) is a powder from a nickel-based superalloy.

5. The method according to claim 1, wherein the layer thickness of the first layer (L1) is 300 µm±20 µm.

6. The method according to claim 1, wherein the step of depositing the second layer (L2) includes depositing three sublayers (SL1-SL3) of the base material (BM) each of which includes a layer thickness between 200 and 400 µm.

7. The method according to claim 6, wherein the step of depositing the second layer (L2) includes depositing three sublayers (SL1-SL3) of the base material (BM) each of which includes a layer thickness is 300 µm±20 µm.

8. The method according to claim 1, wherein the first (L1) and/or the second layer (L2) are deposited at a rate of above 6 cm$^3$/h.

9. The method according to claim 1, wherein the first layer is deposited directly onto the substrate (1) in order to prevent cracking in the base material (BM) during the thermal treatment.

10. The method according to claim 1, wherein the method is a generative or a bottom-up manufacturing process.

11. The method according to claim 1, wherein the base material is a metallic alloy.

* * * * *